Dec. 15, 1936.　　A. A. GRINNELL　　2,064,536
VEHICLE CONSTRUCTION
Filed Sept. 6, 1933　　2 Sheets-Sheet 1
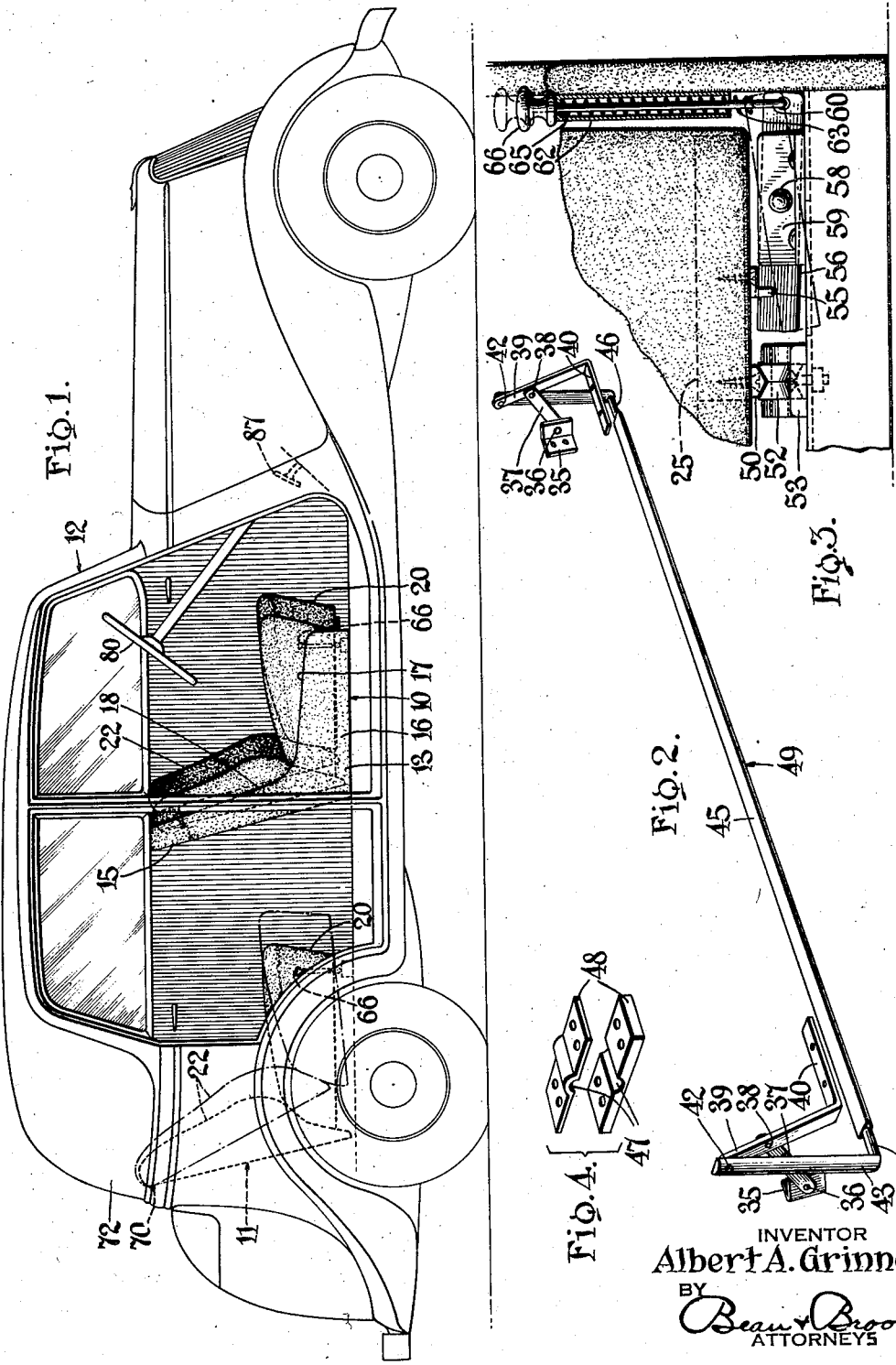
INVENTOR
Albert A. Grinnell,
BY
Beau & Brooks
ATTORNEYS

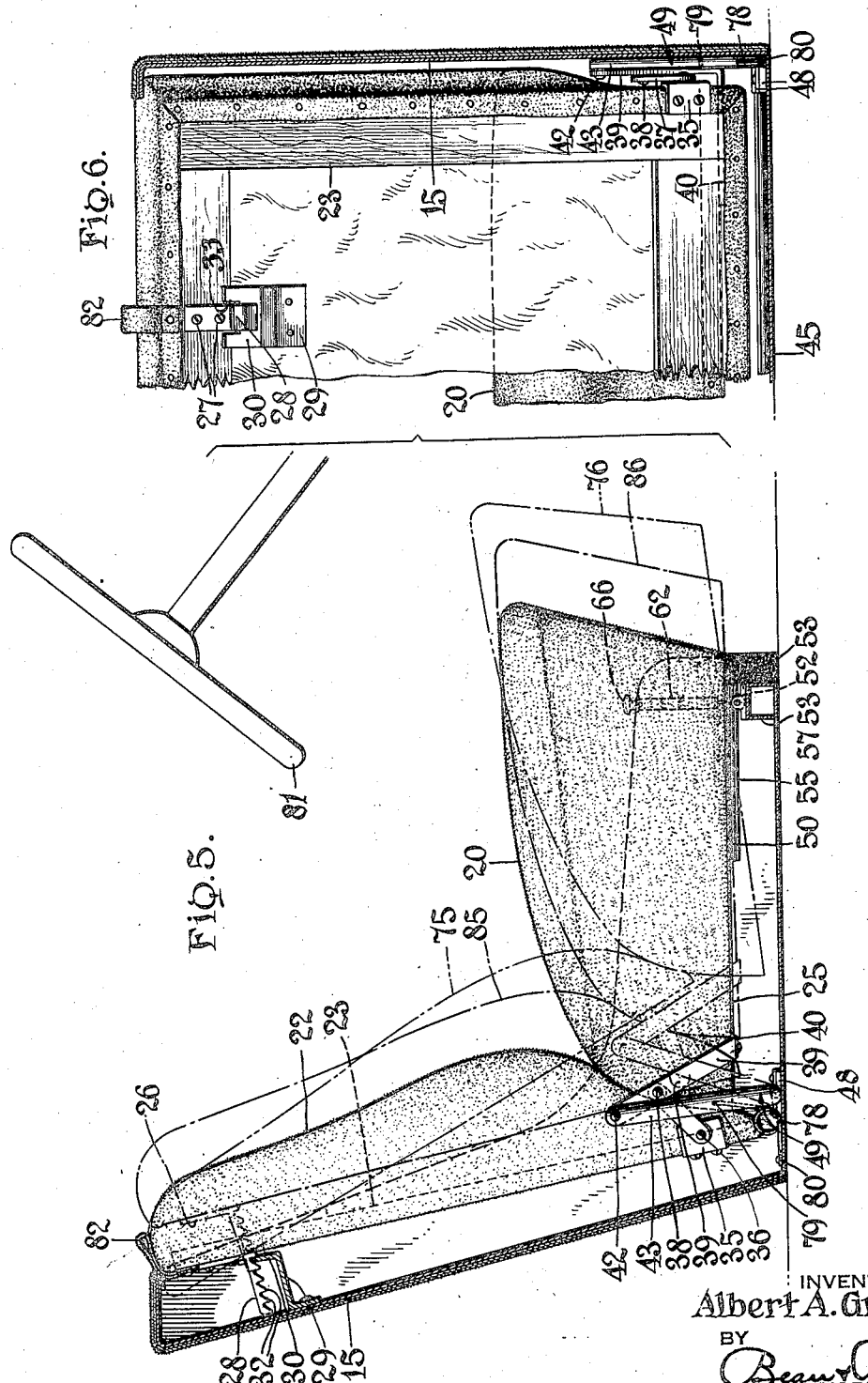

Patented Dec. 15, 1936

2,064,536

UNITED STATES PATENT OFFICE 2,064,536

VEHICLE CONSTRUCTION

Albert A. Grinnell, Medina, N. Y., assignor to Whedon, Inc., Medina, N. Y.

Application September 6, 1933, Serial No. 688,404

1 Claim. (Cl. 155—14)

This invention relates to adjustable seats for vehicles, and it has particular relation to a seating structure wherein supporting members, seat, and seat back can be relatively moved to conform comfortably to various sizes and physical peculiarities of different types of persons in such manner that they can assume upright, reclining or semi-reclining positions with ease and comfort.
Persons traveling in various types of vehicles, frequently desire to change their postures to promote ease in driving a vehicle or to counteract tiresomeness which occurs as a result of sitting in one position for an extended length of time. It is known that various types of adjustable seat structure have previously been designed with varying degrees of success. This invention is concerned with the provision of an improved adjustable seat structure wherein an occupant may adjust the seating elements to provide a comfortable upright seating posture, or the seat may be so adjusted that the seat proper is changed, as to its angular relation to the horizontal, to lower or raise portions thereof according to the physical characteristics of the individual, while at the same time, providing for adjustment of the seating elements to such positions as to permit the occupant to assume a reclining or semi-reclining posture.
One of the important advantages of the invention involves the relationship of the steering wheel of a vehicle and the adjustable portions of the seat structure, together with the relationship of these elements to the vehicle control pedals, whereby persons of various degrees of stoutness and other physical peculiarities can be comfortably positioned without interference of parts of the anatomy with the steering wheel, at at the same time, providing entire freedom and ease of manipulation of the person's feet upon the pedals.

These and other objects and advantages, including those inherent in the relationships and arrangements of the component parts of the disclosure, will become apparent from a perusal of the herein included description of a typical embodiment of the invention illustrated in the accompanying drawings.

In the drawings:
Fig. 1 is a diagrammatic side elevation of a vehicle having the improved seating structure incorporated therein;

Fig. 2 is a perspective of an adjustable linkage for facilitating the moving of the seating structure to various adjusted positions;

Fig. 3 is a fragmentary elevation, on a larger scale, illustrating a latching mechanism for maintaining the seating structure in various adjusted positions;

Fig. 4 is a perspective of securing plates for assembling the adjustable linkage in the seating structure;

Fig. 5 is a side elevation, on a larger scale, illustrating in detail a seating unit including the structure for adjusting it; and

Fig. 6 is a fragmentary rear elevation of a seating unit with portions omitted to facilitate the illustrating of details thereof.

In practicing the invention, seating structures or units 10 and 11 are incorporated in a vehicle 12, and each unit includes a seat support 13 having rearwardly inclined back and substantially horizontal bottom supporting members 15 and 16, respectively. Suitable flanges 17 and 18 constitute forwardly extending portions of each support, which by virtue thereof, provide a recessed or channel-like structure for movably receiving the seat structure. A seat 20 and a back 22 are included in each seat structure.

Substantially upright and horizontal frame structures 23 and 25 respectively, constitute the rigid portions of the seat and back, and the upper or upright frame structure 23 has a bracket 26 rigidly secured centrally to the upper portion thereof, as indicated at 27, together with a rearwardly extending integral or rigid rack bar 28 for adjusting the back forwardly or rearwardly.

In this arrangement, which is particularly adapted for use as a front or driver's seat of a vehicle, an angular bracket plate 29 is rigidly secured to the back support 15 and is provided with an upwardly extending flange 30 for engagement with or between any two adjacent teeth 32 of the rack bar 28, thus providing for pivotal suspension of the upper portion of the seat back. As best shown in Figs. 5 and 6, the flange 30 of the bracket plate has a notch 33 which guides the forward and rearward movement of the rack bar 28.

The lower portion of the seat back 22 is provided on or adjacent each side of the rear with an angle bracket 35 rigidly secured thereto for supporting a pivotal connection 36 of one end of a link 37 that has a similar pivotal connection 38 at its other end upon an intermediate portion of an upwardly extending arm 39 of an angular stirrup 40. Each of the stirrups is rigidly secured upon the lower or bottom portion of the lower seat frame 25.

Upper end portions of the arms 39 are provided with pivotal connections 42 for pivotal support upon the upper ends of upright arms 43 of a U-shaped transverse rocker 45, the intermediate or horizontal portion of which is provided with reduced bearing portions 46 rotatably mounted in cooperating bearing portions 47 of plates 48 that are bolted to the bottom section of the support 13. The rocker 45, together with its upright arms 43, is rigid and moves as a unit in the bearings 47 at opposite sides of the seat 20. Thus it will be apparent that any forces tending to rock the one arm 43 will be transmitted in substantially equal intensity to the other arm 43. The structural elements numbered from 35 to 46 constitute a linkage 49 for partially supporting, and providing forward and rearward swinging of the seat back 18 and seat proper 20 to various positions.

Seat supporting rails 50 secured to the lower surface of the seat bottom frame 25 are substantially V-shaped in cross section, and rest upon rollers 52 carried adjacent opposite sides of the seat upon a transverse frame member 53 of the seat support. The peripheral surfaces of the rollers are shaped to conform to the cross sectional V-shape of the rails 53 which ride thereon, and thus prevent undesirable lateral displacement of the seat.

In order to maintain the seat in any of its various adjusted positions, a rack bar 55 (Fig. 3) of angle form is rigidly secured to the lower portion of the seat frame and a latch 56 having one end movable into engagement between any two of the rack teeth 57 is pivoted, as indicated at 58, intermediate its ends upon a bracket 59 that is bolted to the support 13. An upright rod 60, pivotally connected to the outer end of the latch 56, extends through a tube 62 that is rigidly secured to the support 13 and has a coil compression spring 63 surrounding it. One end of the coil spring rests upon the outer end portion of the latch 56 and its other or upper end extends toward, for contact with, an upper head or wall 65 of the tube.

In order to move the inner end of the latch into and out of engagement with the rack bar 55, a knob 66 on the upper end of the rod 62 is manipulated in the proper direction, i. e., drawn upwardly. On the other hand, the compression spring 63 normally maintains the latch in engagement with the rack bar by urging it in a clockwise direction about the pivotal connection 58.

The structure of the unit 11 which is particularly designed for incorporation in a rear seat structure of a vehicle, or for a seat other than the driver's seat, is constructed in substantially the same manner as that previously described with reference to the unit 10, with the exception that the upper end of the seat back 22 is not provided with a rack bar adjustment, but has a pivotal connection 70 to the vehicle body structure 72. The surrounding body structure embraces the adjustable seat structure in substantially the same manner as the seat receiving support 13.

In the position of the structural elements, as shown in Fig. 5, the seat is adjusted for accommodating a relatively tall person to be seated in a relatively erect posture. If a person so seated desires a more relaxed or reclining position, the knob 66 is manipulated to release the latch 56 from the rack bar 55, and then by pressing the shoulders rearwardly against the upper portion of the seat back 22 concurrently with a forward hip movement, the seat back is moved pivotally about the connection between the rack bar 28 and plate flange 30, to a more inclined position, as indicated by the broken lines 75. In this movement, the seat 20 is also shifted forwardly to the broken line position indicated at 76, and the forward edge of the seat 20 is tilted slightly upwardly while the rear edge is tilted slightly downwardly, as clearly indicated by the broken lines of Fig. 5, as the forward portion of the seat is movably carried upon the rollers 52.

The action of the linkage 49 in this adjustment is such that the upwardly extending arms 43 of the unitary rocker 45 are tilted forwardly about the bearing portions 46—47, and as the upper pivotal connections 42, serving as suspension points for the seat 20, follow a forward and gradually increasing downward movement in an arcuate path, the rear end of each link 37 containing the pivotal connection 36 moves slightly upwardly in the arcuate path described by the seat back 22 about its upper pivotal support. Thus the link 37 may be termed a floating link because it moves forwardly and rearwardly during relative upward and downward movement of its opposite ends, and thereby permitting forward and upward swinging movement of the lower portion of the seat back, as well as the tilting of the front edge of the seat 20 upwardly and its rear edge downwardly.

A coil torsion spring 78 located adjacent the junction of the seat 20 and seat back 22 has one end connected, as indicated at 79, to one upright arm 43 of the linkage, and its other end connected, as indicated at 80, to the seat support 13. This spring is normally under tension and exerts a constant force tending to draw the seat rearwardly. The tension of course is increased as the seat is moved forwardly and hence only very slight exertion of a person in the seat is required to move the seat rearwardly from a forwardly adjusted position.

The operation so far described is substantially the same for both units 10 and 11 of the structure described. However, if a smaller person is seated in the driver's seat under the steering wheel 81 of the vehicle, it may be desirable to move the entire seating members bodily forward, or only the back 22 may be moved forwardly. In this kind of adjustment (Fig. 5), a strap or loop 82 is provided at the upper portion of the seat back 22 to facilitate the forward movement of the upper portion of the back 22 to the desired adjusted position of the rack bar 28 upon the plate flange 30, e. g., to the position indicated by the broken lines 85. After this adjustment has been achieved, the smaller person may also move the seat 20 forwardly to the position indicated by the broken lines 86, while its front and rear edges are tilted upwardly and downwardly as previously described. Since the rear portion of the seat 20 is capable of being tilted downwardly, more space can be provided between the steering wheel and the mid portion of the person seated in the driver's seat than is ordinarily available, and a person with shorter limbs can also conveniently reach pedal structure 87 of the vehicle. A short stout person, in shifting himself forwardly in order to properly reach the vehicle pedals in an ordinary conventional vehicle, would, in all probability, move against the steering wheel; whereas, in the improved structure the person's body can be moved forwardly and downwardly somewhat underneath the steering wheel to a comfortable relation to the various parts of the vehicle. Hence, this construction provides for cooperation between the driver's seat unit and the steering wheel, together with the pedal structure, to accommodate persons of various degrees of stoutness and/or height, and in a comfortable and pleasing manner.

Although only illustrative structural arrangements have been shown and described in detail, it will be apparent to those skilled in the art that the invention is not so limited, but that various changes may be made therein without departing from the spirit of the invention or from the scope of the appended claim.

I claim:

In a seating structure, a seat bottom and seat back movable forwardly and rearwardly, means for guiding and supporting the forward portion of the seat bottom for movement in a predetermined substantially horizontal path, a rocker extending transversely of the seating structure and having upwardly extending rigid arms disposed on opposite sides of the seat bottom, a stationary support in the seating structure having journals for supporting the intermediate portion of the rocker, upwardly extending stirrups secured rigidly to the rear side portions of the seat bottom and having pivotal connections to the upper ends of the rocker arms, a link adjacent each side of the seat bottom, each link being pivotally connected to the adjacent stirrup and to the lower portion of the seat back, means pivotally supporting the upper portion of the seat back in a plurality of forward and rearward positions and providing for swinging motion of the lower portion of the seat back incidental to the movement of the seat bottom regardless of the forward or rearward position of the upper portion of the seat back, and resilient means engaging one of the rocker arms and resiliently urging the arms toward an upright position.

ALBERT A. GRINNELL.